(12) United States Patent
Paoluccio et al.

(10) Patent No.: US 10,350,526 B2
(45) Date of Patent: *Jul. 16, 2019

(54) CLOSED ANTIOXIDANT FLUID SYSTEM AND METHOD FOR PROMOTING ANTIOXIDANT PROPERTIES THEREOF

(71) Applicants: John J Paoluccio, Modesto, CA (US); John A Paoluccio, Modesto, CA (US)

(72) Inventors: John J Paoluccio, Modesto, CA (US); John A Paoluccio, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,675

(22) Filed: May 11, 2018

(65) Prior Publication Data

US 2018/0257014 A1      Sep. 13, 2018

Related U.S. Application Data

(63) Continuation of application No. 13/958,613, filed on Aug. 5, 2013, now Pat. No. 9,993,758.

(51) Int. Cl.
| | | |
|---|---|---|
| *B01D 36/00* | (2006.01) | |
| *C10M 175/00* | (2006.01) | |
| *F15B 1/26* | (2006.01) | |
| *F15B 21/041* | (2019.01) | |
| *F16N 39/00* | (2006.01) | |

(52) U.S. Cl.
CPC ........ *B01D 36/00* (2013.01); *C10M 175/00* (2013.01); *F15B 1/26* (2013.01); *F15B 21/041* (2013.01); *F16N 39/00* (2013.01); *Y10T 137/3003* (2015.04); *Y10T 137/6525* (2015.04)

(58) Field of Classification Search
CPC ......... Y10T 137/3003; Y10T 137/6416; Y10T 137/6525; B01D 36/00; C10M 175/00; F15B 1/26; F15B 21/041; F16N 39/00
USPC ............. 137/171, 334, 338; 95/138; 96/108, 96/134; 422/211, 222; 423/219
See application file for complete search history.

(56) References Cited

U.S. PATENT DOCUMENTS

| | | | | | |
|---|---|---|---|---|---|
| 4,096,039 | A | * | 6/1978 | Carnine | B01D 3/42 202/205 |
| 4,232,492 | A | * | 11/1980 | Remick | E06B 3/677 428/34 |
| 4,820,442 | A | * | 4/1989 | Motoyama | A01N 59/16 252/188.28 |
| 4,827,719 | A | * | 5/1989 | Paoluccio | F15B 1/265 60/478 |
| 5,092,914 | A | * | 3/1992 | Cullen | A23L 3/3418 426/124 |
| 5,120,585 | A | * | 6/1992 | Sutter | A23L 3/3418 206/484.1 |

(Continued)

*Primary Examiner* — Robert K Arundale
*Assistant Examiner* — Jonathan J Waddy
(74) *Attorney, Agent, or Firm* — Robert S. Smith

(57) ABSTRACT

A closed lubrication or hydraulic system that eliminates the traditional breather cap and includes (1) oxygen absorber that removes oxygen molecules and (2) a desiccant to dry the air that communicates with hydraulic fluid or lubricant in a reservoir. A metallic heat conduction rod is partially exposed to internal air and partly exposed to ambient air. The conduction rod is in close proximity to the oxygen absorber and desiccant in the cartridge. A cool portion on the conduction rod attracts hot humid internal air causing condensation of water near the surface of the conduction rod.

8 Claims, 7 Drawing Sheets

(56) References Cited

U.S. PATENT DOCUMENTS

| | | | | |
|---|---|---|---|---|
| 5,293,756 A * | 3/1994 | Nelson | .................... | F25B 45/00 |
| | | | | 383/113 |
| 5,701,891 A * | 12/1997 | Groenke | ........... | A61M 16/1045 |
| | | | | 128/201.13 |
| 5,902,362 A * | 5/1999 | Paoluccio | .......... | B01D 46/0031 |
| | | | | 55/418 |
| 6,561,185 B1 * | 5/2003 | Kroll | ..................... | A61M 16/10 |
| | | | | 128/202.12 |
| 9,993,758 B2 * | 6/2018 | Paoluccio | .............. | B01D 36/00 |
| 2003/0168062 A1 * | 9/2003 | Blythe | .............. | A61M 15/0065 |
| | | | | 128/203.12 |
| 2006/0035124 A1 * | 2/2006 | Takei | ................... | B01D 5/0003 |
| | | | | 429/414 |
| 2007/0157929 A1 * | 7/2007 | Radomski | ......... | A61M 16/1075 |
| | | | | 128/204.18 |
| 2008/0078563 A1 * | 4/2008 | Hock | ................ | A62C 99/0018 |
| | | | | 169/49 |
| 2011/0180551 A1 * | 7/2011 | Handa | .............. | B60K 15/03006 |
| | | | | 220/592.2 |
| 2013/0074978 A1 * | 3/2013 | Rasmussen | .......... | B67D 1/0443 |
| | | | | 141/2 |
| 2014/0072656 A1 * | 3/2014 | Mitchell | ................... | C02F 1/76 |
| | | | | 424/661 |

\* cited by examiner

CLOSED ANTIOXIDANT FLUID SYSTEM AND METHOD FOR PROMOTING ANTIOXIDANT PROPERTIES THEREOF

CROSS-REFERENCE TO RELATED APPLICATIONS

This application is a continuation of U.S. patent application Ser. No. 13/958,613 filed Aug. 5, 2013 which has matured into U.S. Pat. No. 9,993,758 on Jun. 12, 2018.

This application is related to prior applications of John A. Paoluccio, a coinventor of the present application, that have matured into an issued patent: Closed Hydraulic system with Drying Means, U.S. Pat. No. 4,827,719.

TECHNICAL FIELD

The invention relates to oil, grease and other fluid containing systems including hydraulic systems and gear boxes. Although the invention has such broad application the description herein will primarily be described with respect to hydraulic systems. More particularly, the present invention is directed to improvements in such systems that will reduce contamination of the fluid and thereby reduce maintenance requirements and wear of the respective components of the system.

BACKGROUND OF THE INVENTION

For many years industry has relied on frequent oil and filter changes to minimize wear and tear on "open" hydraulic systems. The term "open" as used herein refers to systems that include an air breather cap that allows air to enter and leave the oil reservoir due to changes in the level of the oil in the reservoir and air temperature. The "open" oil reservoir operates at near ambient air pressure. The vast majority of hydraulic oil systems and gearboxes are "open" systems.

Some prior art methods have breather caps with filters and/or air driers. These helped reduce ingression contamination, but they quickly lose utility because they are costly to service when dirty or the desiccant becomes saturated. Fine particles and moisture are only reduced with this prior art. Still, later prior art methods include applicant's U.S. Pat. No. 4,827,719 that "closed" the "open" system and helped dry the air in the reservoir. This improved contamination control by controlling ingression, but all the above prior art failed to prevent oil oxidation. The oil still continues to operate in ambient air concentrations of about 21% oxygen with resultant oxidation of the oil. As oxidation occurs the oil becomes contaminated with detrimental chemicals and the formation of sludge and varnish. The result is continued oil and filter changes as well as wear and tear on seals, valves and internal parts. Systems that require the use of 2 micron or sub-micron oil filters require frequent costly replacements.

The prior art includes the apparatus described in U.S. Pat. Nos. 4,827,719, 4,135,635; 3,330,902; 2,095,752; 1,652,793; and 4,161,964. These devices have not been wholly satisfactory because, in part, they do not reduce the oxygen content thereby allowing oxidation of the oil, sludge formation and oil contamination.

Most hydraulic oil systems are of the "open" system type. They have an oil reservoir with a breather cap. The air space above the oil in the reservoir will typically be 20% or more of the reservoir volume. As the oil level changes due to system operation, or temperature changes reservoir air exits and enters the air breather port to maintain near ambient air pressure. The expansion and contraction of the air and oil along with the system operation causes considerable amounts of air to enter and leave the reservoir. The ambient air entering carries with it 21% oxygen, moisture, dust, dirt, pollen, microbes and many other airborne contaminants. These are all detrimental to oil or other fluid. The expelled air carries with it oil mist that fouls the surrounding equipment with an oil film and contaminants the ambient air with the oil mist. These consequences are all the result of an "open" system.

Typical equipment applications include tractors, automobile braking systems; refuse trucks, military tanks, shipboard, cranes, forklifts, power steering, gearboxes, wind turbines, mining equipment, and food processing plant equipment, hydraulic presses, factories, storage tanks as well as drums and other oil containing equipment. While hydraulic systems are referred to herein those skilled in the art will recognize that apparatus and methods described herein may also be applicable to a wide variety of fluid systems.

Many new automobiles include gear boxes that operate at high speeds and extreme conditions. Such gear boxes function at up to a 300 F operating temperature. Such autos may drive over bumpy roads and run through water that splashes on and quickly cools the gearbox. These sudden temperature changes cause ambient air with water, dirt and other contaminants to enter the air breather port. Such conditions result in costly repairs and downtime and manufacturers then need to charge more and shorten warranty periods. The gearboxes are generally not easily accessible, and they will benefit if an oil protection device that addresses all the operating conditions whereby no maintenance service will be required for 5 to 10 years.

Many hydraulic systems in both industrial and commercial applications are exposed to substantial environmental related contamination from ambient air and, thus, are highly vulnerable. The major causes for oil contamination are water, ingression of air and airborne contaminants and oxidation of the oil that results in sludge buildup, degradation of the oil and costly service and repairs. For example, garbage trucks commonly have hydraulic system utilizing thirty (30) gallon reservoirs that require frequent oil and filter changes. Despite these changes the systems still suffer repetitive failures of expensive hydraulic equipment and costly downtime. Similar problems occur in numerous other industrial hydraulic systems including automobile brake systems. Frequently the expense of the individual hydraulic system components is very great. In addition, the down time of the equipment involved is also very significant.

Most reservoirs have a breather vent to ambient air. Such systems are considered "open" systems. This process of "reservoir air breathing", as it is called in industry, is a major source of hydraulic or other fluid contamination. As a result of the sludge from oxidation, dirt and moisture contamination of the hydraulic fluid, the life of all moving parts in the hydraulic system including pumps and various moving apparatus are greatly reduced. In addition, hydraulic fluid and filters must be changed more frequently.

Even systems fitted with inlet breather filters and dryers allow for ingression of air including oxygen as well as moisture and other contaminants. Such filters and dryers help to remove some of the airborne particles and moisture, but oxygen, fine particles and moisture still pass through. An additional problem is that many of the dryers become saturated and quickly lose the ability to remove moisture. The exposure of the hydraulic fluid or the lubricant in the reservoir to the ambient atmosphere is undesirable because it results in faster contamination of the lubricant or other hydraulic fluid as well as contamination of the atmosphere when reservoir air is expelled. The contamination of the hydraulic or other fluid is typically caused by oxidation of the fluid which is often accelerated by ambient air entering and leaving the reservoir.

Even "closed" systems are occasionally "open" when fluid is added to the respective system or other service or repair occurs. These prior art devices do nothing to remove the detrimental oxygen in the internal air that results in oxidation of the oil. The ambient air contains 21% oxygen, 78% nitrogen and varying amounts of water vapor. The term "oil" as used herein will be understood to include both oil as well as other fluids including synthetic hydraulic fluids. The oxygen within the reservoir, in the presence of hot oil (operating systems may have fluids that have operating temperatures of 40° F. to 140° F. or more above ambient temperature). Oxidation of the oil occurs, especially during high humid temperatures and this degrades the lubrication qualities resulting in excess wear on metal parts. With even small amounts of moisture in the system the oil contamination occurs.

In the conventional hydraulic system, the quantity of fluid in the hydraulic system reservoir can vary substantially during the operating cycle. Various valves may be opened or closed, a cylinder may be full or empty, etc., and, thus the quantity of hydraulic fluid in the reservoir varies substantially during normal operation. In addition, the volumetric expansion rate for the hydraulic fluid and air in the reservoir differs substantially. In the conventional open system, the air breather cap allows air to enter and leave as the respective volumes of hydraulic fluid and air in the reservoir change. For example, the oil level in the reservoir may change only 5 percent due to temperature changes and system operation. However, the air volume above the reservoir may vary 15 percent due to temperature changes. Oil has a coefficient of expansion of 0.0004/F. If the oil temperature increased from 60° F. to 140° F. (80° F. temperature difference) it would result in an increase in cubical volume by 3%. Air at 60° F. has a specific volume of 13.2 CF/lb. (cubic feet per pound). Air at 140° F. has a specific volume of 15.4 CF/lb. Therefore, the air increases in volume 16% as the result of the same 80° F. increase. A hydraulic oil reservoir always remains close to ambient pressure, even in "closed" systems. Pressure relief valves insure very little buildup of pressure or vacuum. Accordingly, the 80° F. change results in a 20 percent total volume change. Since the oil remains in the system, the entire 20 percent air volume change passes back and forth through the air breather port drawing in ambient air with all its contaminants.

Oil oxidation is one of the most serious oil contamination problems and cause of frequent oil and filter changes and results in downtime and shortened hydraulic equipment life. Oil oxidation is the chemical reaction that occurs between an oil molecule and oxygen which is present in the ambient air. Ambient air contains 21% oxygen and 78% nitrogen. A nitrogen environment is desired in contact with oil because nitrgen is an inert gas.

Oil oxidation results in a catastrophic and permanent chemical change to the base oil molecules that degrade the oils lubrication properties. When oil oxidation occurs the degraded oil includes detrimental chemicals including aldehydes, ketones, hydro peroxides and carboxylic acids.

The rate at which oil oxidation occurs depends on the temperature and oxygen concentration along with many other factors. Many chemical reactions including rates of oxidation increase exponentially with increasing temperature. The rate of oil oxidation may double for every 10° C. (18° F.) rise in temperature above 75° C. (165° F.). The range of temperatures that hydraulic systems, gear boxes and other oil systems operate varies widely depending on environmental and other factors with below freezing to over 100° C. (212° F.) being not uncommon.

The formation of Carboxylic acids causes acidic corrosion and the formation of sludge and varnish in solid form. Such materials are sticky and can cause filter plugging, fouling of critical oil clearances and valve stiction in hydraulics systems. Water in the oil that mixes with the sludge causing even more corrosion and wear problems.

From the above, it is therefore seen that there exists a need in the art to overcome the deficiencies and limitations described herein and above.

Various other applications such as commercial processes utilizing various fluids will be apparent to those skilled in the art. Examples of application for the present invention include systems utilizing (1) petroleum based lubricants and hydraulic fluids and (2) synthetic fluids including synthetic hydraulic fluids as well as to other fluids and (3) drums and tanks for storage such as fuel tanks.

SUMMARY OF THE INVENTION

Accordingly, it is an object of the present invention to provide a practical compact product to prevent all the main causes of oil contamination and equipment wear and tear.

It is another object of the invention to provide an apparatus and method for attaching to an existing air breather cap connection port on the oil reservoir of a hydraulic or other fluid system.

It is also an object of the invention to "close" the system and alter the interior environment to a clean, dry, cooler and high nitrogen content.

A further object of the present invention is to provide a nitrogen rich system environment in a simple, inexpensive and continuous way by absorbing oxygen.

Another object of the present invention is to provide a low cost solution that will prolong the required maintenance intervals.

A still further object of the present invention includes an embodiment that includes a simple and inexpensive auxiliary reservoir that attaches to a hydraulic oil reservoir to protect the oil and equipment. This embodiment works with both new and existing hydraulic oil equipment, gearboxes and other oil containing equipment to prevent oil contamination that results in degrading and oxidation of the oil.

It is a further object of this invention to combine all the respective elements of an invention into a replaceable cartridge form within a housing that can easily be connected to oil containing equipment. This greatly extends oil and filter life. The oil and filters may last many years before needing to be changed. The equipment life should be greatly extended with considerably less wear and tear.

Another object of the invention is to keep any expelled air from the system oil free.

Still further objects of the invention include making equipment more dependable in harsh environments; reducing the amount of contaminated oil; and reducing the operating and maintenance cost of equipment.

This invention also allows equipment that operates in dusty, humid, marine and sub-zero and high temperatures. Many systems that use low efficiency filters can further benefit by utilizing high efficiency oil filters that are rated 2 microns to sub-micron filtration for extended life.

The recitation herein of desirable objects which are met by various embodiments of the present invention is not meant to imply or suggest that any or all of these objects are present as essential features, either individually or collectively, in the most general embodiment of the present invention or in any of its more specific embodiments. It has now been found that these and other objects of the present invention may be achieved in a hydraulic system which includes a primary fluid reservoir for holding an associated hydraulic fluid, the reservoir being dimensioned and configured to allow any air space above a normal quantity of associated hydraulic fluid disposed within the reservoir to flow to an auxiliary reservoir; and an oxygen absorber disposed in fluid communication with the airspace within and whereby the atmosphere within the reservoir has a higher concentration of nitrogen than the concentration in the surrounding ambient conditions.

Some embodiments of the hydraulic system an oxygen absorber that is physically disposed within the auxiliary reservoir others include a secondary auxiliary reservoir disposed in fluid communication with the auxiliary reservoir and the oxygen absorber is disposed within the auxiliary reservoir. Some embodiments include a desiccant disposed proximate to the oxygen absorber. Some embodiments include a variable volume device surrounding the oxygen absorber and the desiccant.

Some embodiments include an elongated thermally conductive body extending into the variable volume device whereby the axial extremity of the elongated thermally conductive body that is within the variable volume device will usually be cooler than the usual operating temperatures within the variable volume device because the temperatures in an operating hydraulic system will often be a higher than the surrounding ambient temperature conditions whereby moisture within the variable volume device will condense on the axial extremity of the elongated thermally conductive body.

The axial extremity of the elongated thermally conductive body that is within the variable volume device may be disposed proximate to the desiccant and the apparatus may include a pressure relief valve limiting the maximum pressure in the variable volume device as well as a vacuum relief valve limiting the minimum pressure in the variable volume device.

The elongated thermally conductive body is a heat pipe in some embodiments and the heat pipe may be dimensioned and configured to maximize the probability of the temperature at the axial extremity thereof within the variable volume device to be at a temperature below the dew point within the variable volume device. Some embodiments include a desiccant disposed proximate to say oxygen absorber. A variable volume device may surround the oxygen absorber and the desiccant. The apparatus may also include an elongated thermally conductive body extending into the variable volume device whereby the axial extremity of the elongated thermally conductive body that is within the variable volume device will usually be cooler than the usual operating temperatures within the variable volume device because the temperatures in an operating hydraulic system will often be a higher than the surrounding ambient temperature conditions whereby moisture within the variable volume device will condense on the axial extremity of the elongated thermally conductive body.

The axial extremity of the elongated thermally conductive body may be within the variable volume device and disposed proximate to the desiccant. Embodiments may include a pressure relief valve limiting the maximum pressure in the variable volume device as well as a vacuum relief valve limiting the minimum pressure and the variable volume device. The elongated thermally conductive body may be a heat pipe and the heat pipe is dimensioned and configured to maximize the probability of the temperature at the axial extremity thereof within the variable volume device to be at a temperature below the dew point within the variable volume device.

Systems in accordance with the present invention are not limited to hydraulic systems and may even include barrels of liquids or sealed containers of powder such as hygroscopic materials that may be damaged by moisture or other contaminants. Thus such embodiments include a reservoir for containing an associated substance and an oxygen absorber in fluid communication with the reservoir whereby the reservoir has a nitrogen content greater than ambient air.

In some embodiments the oxygen absorber is in fluid communication with a part of the reservoir that is higher than the customary maximum substance level within the reservoir during normal operation of the system. A variable volume device within an auxiliary reservoir may surround the oxygen absorber. A desiccant may be disposed and utilized which may be within the variable volume device.

A conduction rod or a heat pipe may extend between ambient air and gases in fluid communication with the reservoir and the variable volume device. The oxygen absorber may include a steel wool.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
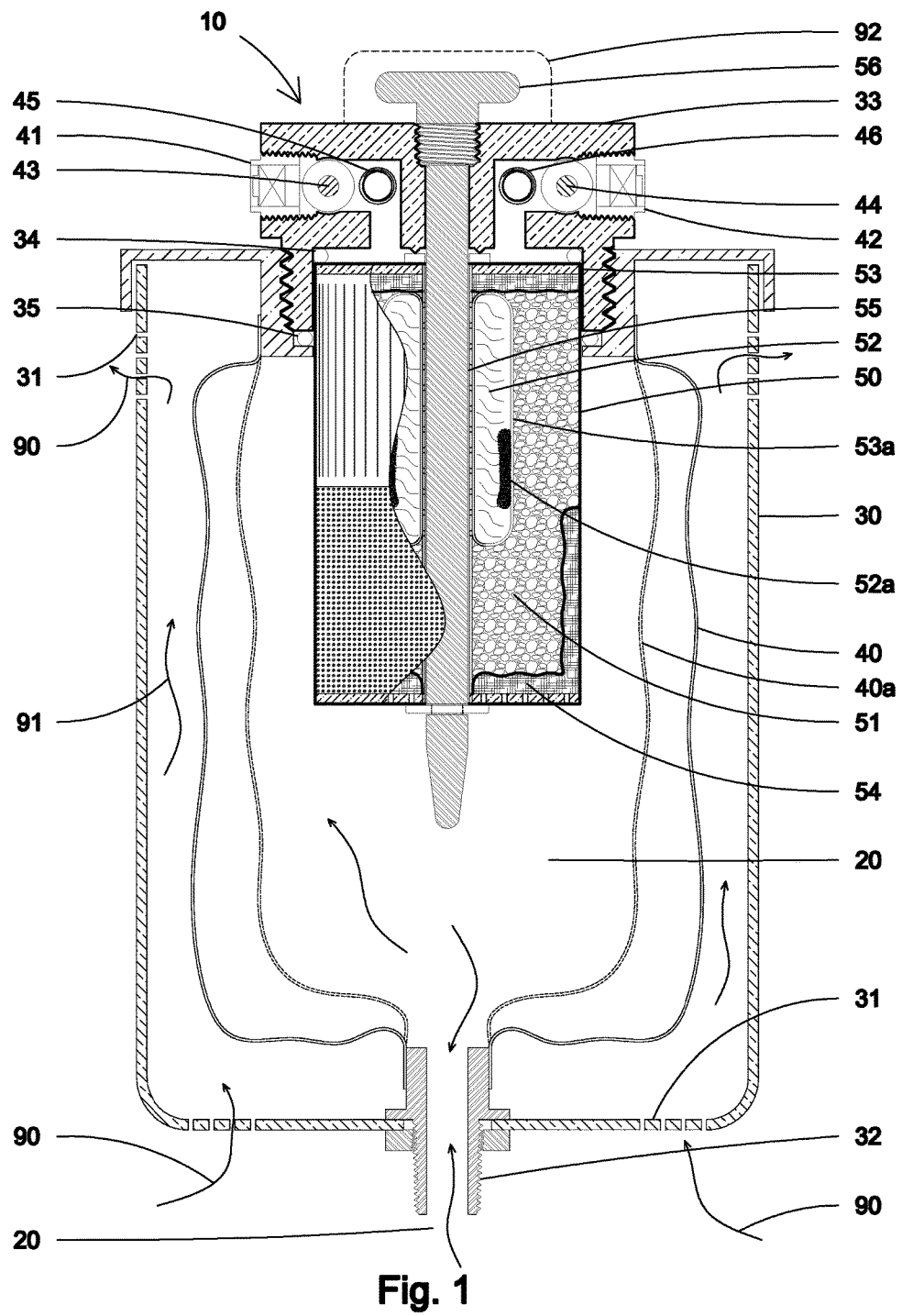
FIG. 1 is a schematic view of one form of the apparatus in accordance with the present invention showing an assembly may be attached directly to the top of an oil reservoir or mounted remotely with interconnecting piping.

The present invention provides a method for creating a cool spot within the auxiliary reservoir air so that water molecules and humid air will be drawn to and condenses on the "cool" surface. This is accomplished by a metallic conduction rod located substantially within the reservoir air in the auxiliary housing and partly exposed to ambient air to create a temperature differential. The cool spot has a surface temperature that is less than the dew point temperature of the reservoir air. The dew point is the temperature where the air is 100% saturated and condensation will occur.

This invention can virtually eliminate or significantly reduce the oxygen concentration in the internal air to a very low percentage, thereby, preventing oxidation from occurring. It also reduces the moisture content close to zero in both the internal air and in the oil. It prevents microbial growth; reduces acid and sludge formation; keeps the existing system filters clean and keeps the oil clean and dry for years instead of months. Clean and dry oil operating in an oxygen free, high nitrogen concentration, environment prevents oxidation of the oil and results in extremely long trouble free equipment operation without oil or filter changes. The present invention also includes heat rejection features allowing the system to run cooler. Accordingly, the present system alters the interior environment to provide clean, dry, oxygen free and high nitrogen state to prevent oxidation and degrading of the oil and the oil and filters may never need changing.

Various embodiments of the present invention may include an auxiliary reservoir with one or more of the following: an access cover, an oxygen absorber, a desiccant dryer 51, a bladder 40, and a conduction rod 55 and 56 and or heat pipe 58.

When the hydraulic system is in operation the oil 12 in the reservoir 11 can become very hot. The oil 12 temperature will typically be 120° F. to 160° F. or more. High temperatures are detrimental to the oil and the reservoir 11. The exposed system surfaces help give up some of this heat energy to ambient air.

The heat pipe 57 used in embodiments of the present invention will vary for specific applications. In some embodiments a vacuum pump is used to remove all air from the empty heat pipe, and then the pipe is filled with a fraction of a percent by volume of working fluid chosen to match the operating temperature. Alternatively, the pipe 57 is heated until the fluid boils, and sealed while hot. The use of a vacuum eliminates the need for the working gas to diffuse through any other gas. Thus, the heat transfer occurs more rapidly.

Inside the pipe's walls, an optional wick structure exerts a capillary pressure on the liquid phase of the working fluid. This is typically a sintered metal powder or a series of grooves parallel to the pipe axis, but it may be any material capable of exerting capillary pressure on the condensed liquid to wick it back to the heated end. The heat pipe may not need a wick structure if gravity or some other source of acceleration is sufficient to overcome surface tension and cause the condensed liquid to flow back to the heated end.

The oxygen absorber 52 in most embodiments of the present invention is in the form of steel wool internal to the system and in close proximity to the conduction rod. The steel wool forms iron oxide or rust in the presence of oxygen and water molecules. This depletes the oxygen concentration to very low levels and stops oxidation of the oil. This also alters the interior environment of the air above the oil to a very high concentration of desirable inert nitrogen gas.

Some embodiments of the present invention provide a desiccant dryer 51 internal to the system and in close proximity to the conduction rod 56 that removes moisture from the interior environment thereby keeping the air and oil dry.

Various embodiments provide a variable volume device or bladder 40 to convert an "open" system to a "closed" system. This stops ingression of ambient air, with 21% oxygen, and airborne water and contaminants from entering system.

The conduction rod 55 and extended area of the auxiliary reservoir and bladder help remove unwanted internal heat buildup and helps lower oil operating temperature.

The auxiliary reservoir apparatus converts the "open" system to a "closed" system that stops ingression of ambient airborne contaminants and acts to continuality remove moisture molecules and oxygen molecules from the reservoir air. This alters the internal environment to a high nitrogen state that prevents oxidation and degrading of the oil.

The following individual components are described as to their individual function. However, these individual components acting in unison compliment and substantially enhance the removal of oxygen molecules and water molecules. This creates and maintains a unique and ideal internal environment of inert nitrogen that can virtually result in no oil or filter changes, greatly extending the life of the equipment and protect the external environment by reducing oil and filter changes. The existing filter within the system may never need to be replaced.

The salient components include a metallic conduction 55 rod, an oxygen absorber 52, desiccant dryer 51 and coalescing filter 54 that may all operate within the variable volume device 40 of the auxiliary reservoir 10 (oil protector invention) apparatus.

The access cover 33 is in top of the housing 30. The cover 33 allows access to the enclosed combination cartridge 50 that contains the oxygen absorber 52, desiccant dryer 51, particle filters 53, and coalescing filter 54. A plurality of ports on the cover 33 include vacuum relief valve 41, pressure relief valve 42, moisture indicator 44, and oxygen indicator 45. Options in the cover include ports for a valve 46 for nitrogen fill, pressure gage 47, and temperature gage 48. The cover 33 also has a port for the conduction rod 55 that passes through the center of the cartridge 50 in the illustrated embodiment. The cover 33 may have gaskets 34, and 35 to form an air tight seal to the housing.

A metallic conduction rod 55 and or heat pipe 58 (hereinafter collectively referred to as "conduction rod" is utilized in the present invention. (The heat pipe 58 will be further described later in the application.) The conduction rod 55 is used to direct the water molecules 60 in the internal air 20 to a cool point on the conduction rod 55 where the vapor molecules 60 condense into liquid water 61. Part of the conduction rod 55 is exposed to the air 20 within the variable volume device 40 while a portion is exposed to ambient air 90. The purpose of the conduction rod 55 is to cause a cooler surface on part of the conduction rod 55 that may be at less than the dew point temperature of the reservoir air 20 that may be within the variable volume device 40.

When the hydraulic system is operating, moisture from the air 20 and in the hydroscopic hydraulic oil 12 and water that settled, at system low points, becomes entrained in the oil 12 during startup and operation. When the oil 12 becomes hot this moisture is driven out of the oil 12 in the form of water vapor or water molecules 60. This in turn raises the moisture content in the air 20 to hot and humid conditions. It is common for this moisture to condense on any cool surfaces and drip back into the oil 12. It is desirous to cause this moisture to condense on a specific or control portion of the conduction rod 55 instead. With part of the conduction rod 55 being exposed to the cooler ambient air 90 when the system is operating, the ends of the conduction rod 55 will be at different temperatures.

For example, the reservoir air 20 may at 140° F. and outside ambient air 90 may be at 50° F. The end of the conduction rod 55 exposed to reservoir air 20 may be at 120° F. and the opposite end, called the conduction head 56, exposed to ambient air 90 may be at 60° F. Along the conduction rod 55 lengths the temperature will vary between the two end temperatures. At some point along the length of the conduction rod 55 may become cool enough to below the dew point temperature of the air 20 to cause the moisture vapor in to condense into liquid water 61. As the vapor condenses, other water molecules 60 in the air 20 move in to replace the captured or condensed water molecules. This invention utilizes a steel wool oxygen absorber 52 and desiccant dryer 51, both located in a cartridge 50, and in close proximity to the conduction rod 55 to accomplish removal of moisture and to create the formation of rust 52a that essentially removes oxygen 70 from the internal air 20. As this continues for days and weeks, the humidity in the reservoir air 20 drops to a lower and lower level until it is very dry. Then, when the system stops operating and cools virtually no water will drop back down on the oil. As this process continues the water in the air 20 and oil 12 should approach zero; the oxygen 70 in the air 20 should also approach close to zero so that oxidation of the oil 12 cannot occur. The equipment should then operate in a contamination free state for years.

The conduction rod 56 also acts to reject internal heat energy and that allows system to operate at a cooler temperature thereby extending oil and equipment life.

Preferred embodiments of the present invention include an oxygen absorber which typically utilizes steel wool. Oxygen depletion can occur within iron housings or chambers when rust occurs. In large metal tanks or void spaces with rusting iron the oxygen level can be depleted to such low levels that one cannot breathe enough oxygen to support life. The present invention puts this "rusting" principal to a very practical use. By decreasing the undesirable oxygen concentration to very low levels the desirable inert nitrogen concentration is increased to very high levels thereby, eliminating oxidation of the oil. This results in a very desirable environment in the air space above the oil. No outside intervention or mechanical nitrogen from a pressure tank or generator is required. This invention uses a natural oxidation phenomenon of rusting, normally considered detrimental but in this case put to good use, to prevent the oxidation of the oil.

Commercial oxygen absorbing packets are available and used in sealed food products to maintain freshness. Oxygen absorbers are made of a chemical compound, with powdered iron being the active ingredient. The powder form provides a very large surface area as rusting occurs on the surface of iron. When exposed to oxygen, the product quickly becomes active which turns the powdered iron to iron-oxide, better known as rust. These packets can reduce the oxygen content to less than one tenth of one percent. Formulation includes types for dry or moist environments.

These commercially available packets generally have a short life and are highly sensitive and quick reacting. For use with this invention, a much slower rusting action is desired. This can be accomplished with iron filings or an iron material like steel wool. For example, a hydraulic system may be partially "open" to ambient air periodically during operation, service and repair and by all the pistons, cylinders and moving parts. Service and inspection or oil sampling may occur periodically and that causes ambient air to enter the normally "closed" system. If it were "open" 5 times over a period of time, and 21% oxygen containing air replaced the oxygen free air inside the reservoir, it is preferred to have a slow rusting material such as iron filings, thin slivers or fine strands of iron that might look like steel wool. That is like the old steel wool that was used in household kitchens for years that rusted and left stains on the sink. The amount of iron content should be substantial to remove all the oxygen each time the system is "open" for any reason for any desired time frame.

The actual amount of iron in the oxygen absorber or steel wool necessary to remove all the oxygen in one cubic foot of air is quite small. When iron is converted to rust or iron oxide it increases in weight by approximately 30%. The weight of one cubic foot of air at 70° F. and 50% humidity weighs 0.075 pounds. The oxygen portion is about 21% or 0.016 pounds or 0.256 ounces or 7.3 grams. Therefore, the steel wool iron weight is 0.053 pounds. The iron oxide or rust weighs 0.069 pounds.

Rust occurs more rapidly at high temperatures and with higher moisture content. This invention uses a "cool surface" principal to ensure that the moisture content in the air will be at the highest rate at the steel wool portion of the cartridge. Example: When one takes a shower the mirror quickly fogs up and condenses water on its surface.

Hydraulic oil is hydroscopic and attracts and contains water. It is very common in large "open" systems to have large amounts of liquid water that settles to the bottom of the reservoir and other low points in the system. The air above the oil may contain a small amount of moisture when the air is cool but can hold much larger amounts when hot. The period where most of the water in the oil is driven into the air, is when the system is hot and operating. This is due to water in the oil and that at low points being driven out by high temperatures into the air above the oil.

As the system turns "off" and starts to cool down the humidity quickly rises to high levels or reaches saturation where condensation occurs on cooler surfaces. This invention takes advantage of this "condensation on cool surfaces" by controlling where the cool spot is. The conduction rod 55 becomes a control point where part of its surface is between the air 20 temperature in the bladder and the outside ambient air 90 temperature. Along the axial extent of the conduction rod 55 the temperature will vary from a higher to a lower temperature. The cool spot may occur within the cartridge 50 area that contains the oxygen absorber 52 and desiccant 51. The lower temperature or "cool spot" may reach the dew point temperature where condensation will occur.

By directing the point where condensation occurs, more of the moisture can be captured by a desiccant 51 in close proximity to the conduction rod 55. Likewise, the steel wool oxygen absorber 52, also in close proximity to the conduction rod 55, will rust 52a faster in the presence of high temperature and high humidity. Even after the system cools down both the desiccant 51 and steel wool 52 will continue to capture the water molecules 60 and oxygen molecules 70 twenty four hours a day, every day, but at a slower rate, until virtually all the contained water and oxygen molecules 70 are taken out of the air 20. This leaves an internal environment of inert nitrogen 80 in the air 20 above the oil 12 thereby, preventing oxidation of the oil 12.

Application Example 1: Hydraulic Oil Reservoir with volume of 5 cubic feet. Oil volume of 4 cubic feet or 30 gallons of oil. Air space of 1 cubic foot. Air changes selected over a period of time or volume for total oxygen 70 removal is 5. It requires 2.7 ounces of iron in steel wool 52 to remove all the oxygen 70 with the 5 air changes. The combination cartridge 50 will then contain the steel wool 52, desiccant 51 and filters 53, 54 to keep the oil 12 clean, dry, oxygen free and in an ideal inert nitrogen 80 environment during the 5 equivalent air changes.

Application Example 2: This same scalable volume relationship applies to a small automobile braking fluid system. In this case the entire reservoir adaptor system is contained in an enlarged reservoir cap.

Figure 4:
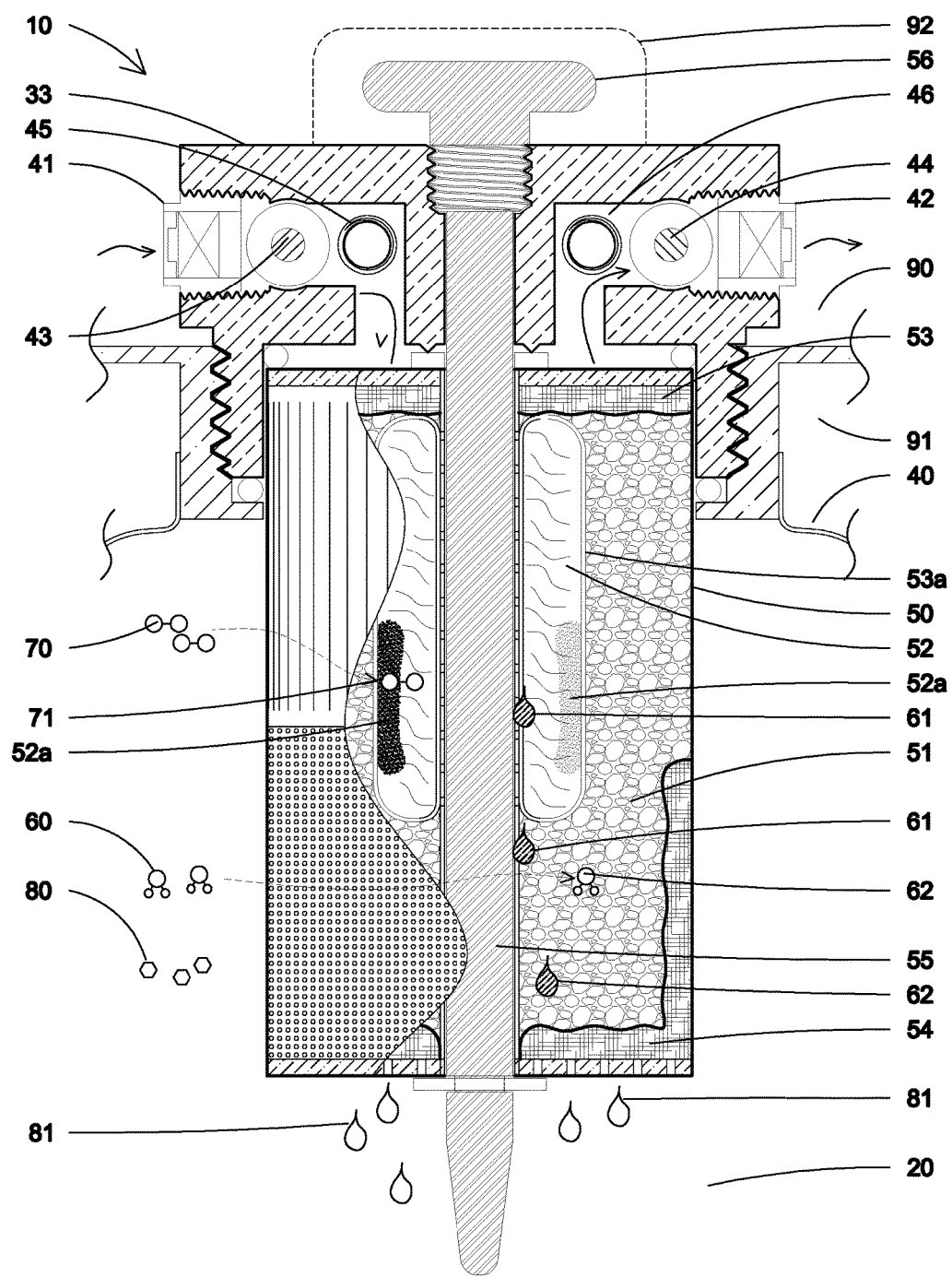
FIG. 4 is an enlarged partial cross section view of a part of the apparatus shown in FIG. 3 which shows the main features, including desiccant, oxygen absorber, coalescing filter, pressure and vacuum relief valves as well as the movement and capture of moisture and oxygen molecules, including the formation of iron oxide resulting in a high concentration of nitrogen in the reservoir air.

Referring to FIG. 4: For practical purposes the steel wool 52 iron portion can be incorporated into a combination cartridge 50 with the desiccant 51, pre-filter 53, and coalescing filter 54. The conduction rod 55 is inserted through the center of the cartridge 50 in the preferred embodiment. This allows for practical manufacturing and replacement service. The cartridge 50 slips over the conduction rod 55. With external view ports or indicators for moisture content and oxygen content the cartridge 50 can be replaced when the indicators show increases in internal moisture or oxygen. The replacement frequency may be 2, 5, 10 or more years.

For example, automobile manufactures suggest that the brake fluid system be changed every 18 months due to contamination of the oil. With this invention technology the time frame might be extended to 5 years or more. This not only results in economic savings but provides for a safer and more reliable braking system.

A desiccant 51 may be incorporated in the combination cartridge 50, along with the steel wool 52, to take advantage of being in close proximity to the conduction rod 55. When a portion of the conduction rod 55 approaches the dew point temperature of the air 20 within the reservoir, moisture molecules 60 will be inclined to migrate toward the cooler portion of the conduction rod 55 and be captured by the desiccant 51. This capture of internal moisture operates 24 hours a day every day. With the desiccant 51 being internal in the "closed" system and not continually exposed to outside air 90, the desiccant 51 should last for years before needing replacement. The preferred embodiment may utilize silica gel beads that are a readily available and inexpensive desiccant. A common color changing silica gel, in bead form, contains cobalt (the cobalt is the color change part of the desiccant) and changes colors from blue when dry to pink when wet. Some locations require non-cobalt containing desiccants due to disposal concerns. A non-cobalt silica gel is available in a yellow, gold or orange color when dry that changes to dark green when wet. Other desiccants such as molecular sieve may also be used and may be preferred in certain cold location applications.

High temperature air that is at or near saturation point can contain considerable moisture. The moisture that air can hold at different temperature and humidity conditions is called the Humidity Ratio and represents pounds of water the moist air can hold per pound of dry air. For example: Saturated air at 56° F. has a humidity ration of 0.01. Saturated air at 127° F. has a humidity ratio of 0.10. Saturated air at 189° F. has a humidity ratio of 1.0. Saturated air at 199° F., has a humidity ratio of 2.0. This shows that hot saturated air at 199° F. can contains 200 times as much water as saturated 56° F. air.

Most "open" prior art systems contain moisture in the air 20 and water in the oil 12 and water at system low points when the system is "off". Water is heavier than oil and settles to low points but can be distributed throughout the entire hydraulic system when operating, where it causes contamination of moving parts. Water can flash to steam when the oil pressure changes from, for example, 3,000 psi to ambient pressure and may occur at seals and other components. Pitting of metal and seal failure can then result. Water 61 in the boundary layer between oil 12 and the bottom of the steel reservoir 11 can cause adverse chemical reactions that result in severe contamination, especially when sludge is involved. Some estimates on corrosion indicate that as little as 0.02% water mixed in with the hydraulic oil will reduce bearing life by 50%. One goal of this invention is to eliminate the water problem.

In some embodiments a coalescing filter 54 is incorporated in the combination cartridge 50, along with the desiccant 51 and steel wool 52. This allows for any oil mist in any expelled air to be captured into oil droplets and drip back into the oil. The coalescing filter 54 and particle filters 53 also prevent any particles from the desiccant 51 or steel wool 52 or rust 52a escaping the cartridge 50. Particle filters 53 also capture airborne dust from air 90 that enters through the vacuum relief valve 41.

Pressure and vacuum relief valves PVRV's 41, 42 may have pressure settings of plus 0.5 psi positive pressure and 0.5 psi negative air pressure. This is considered close to ambient pressure. Should these pressure settings be exceeded due to internal pressure of the air 20 within the reservoir 11, air will enter or leave the system until the pressure settings are not exceeded.

This is an optional feature where a moisture indicator 43 with a clear view port in the cover 33 lets the operator know the relative humidity of the air 20 within the system. The desiccant 51 may be a yellow color when dry and turn dark green when wet. This allows an operator to visually know when it is time to change the cartridge 50 with desiccant 51.

An optional feature where an oxygen indicator 44 with a clear view port in the cover 33 lets the operator know the relative oxygen content of the air 20 within the system. For example, this allows operator to visually know when it is time to change the cartridge 50 with steel wool 52 or other oxygen absorber media.

The preferred embodiment in FIG. 1 includes of the auxiliary housing 10 with a variable volume device or elastic fluid impervious chamber or bladder 40 and means for sealing the variable volume device or elastic fluid impervious chamber (bladder) 40 with the interior thereof in fluid communication with the inside air 20 of a fluid reservoir 11. The auxiliary reservoir 10 may further include a vented housing 30 disposed in spaced relationship around the bladder 40 with at least portions of the space intermediate the housing 30 and the bladder 40 vented to atmosphere, or substantially all the space intermediate the housing 30 and the bladder 40 may be vented to the atmosphere.

The bladder 40 also referred to as a variable volume device or an elastic fluid impervious chamber, bellows or other flexible material that can accomplish and accommodate the necessary volumetric changes in air volume due to expansion, contraction or system operation. The preferred form of the material may be urethane coated nylon fabric or other flexible material. In some variations of this invention the bladder 40*a* may be biased to maintain a predetermined volume such as 50% full when at rest or exposed to no pressure.

The foregoing objects and other objects and advantages which shall become apparent from the detailed description of the preferred embodiment are attained in an auxiliary reservoir 10 for use either as part of or with an associated fluid system, which comprises an elastic fluid impervious chamber 40 and means for sealing the elastic fluid impervious chamber 40 with the interior thereof in fluid communication with the inside air 20 of a fluid reservoir 11. The auxiliary reservoir 10 may further include a housing 30 disposed in spaced relationship around the elastic fluid impervious chamber 40 with at least portions of the space intermediate the housing 30 and the elastic fluid impervious chamber 40 vented to atmosphere, or substantially all the space intermediate the housing 30 and the elastic fluid impervious chamber 40 may be vented to the atmosphere. The auxiliary reservoir 10 shall include a vacuum release means 41 either alone or in combination with a pressure release means 42.

A desiccant dryer 51 shall be provided in fluid communication with the interior air 20 of the reservoir 11. An oxygen absorber 52, such as steel wool, or iron filings that forms iron oxide 52*a* or rust 52*a* when exposed to oxygen 70 and moisture 60 shall be in close proximity to the desiccant 51. A metallic heat conduction rod 55 and or a heat pipe 58 shall be partially exposed to internal air 20 and partially exposed to ambient air 90. A portion of the metallic conduction rod may be in close proximity to the desiccant and the oxygen absorber. A filter 53 for airborne particles may be used to filter any incoming air 90 that passes through the vacuum relief valve 41. A coalescing filter 54 may be in close proximity to the desiccant 51 and oxygen absorber 52 and shall be between the pressure relief valve 42 and internal air 20.

Since this invention works 24 hours every day, whether the system is operating or not, and in all sorts of environments, to protect the oil system the oxygen absorber 52 and desiccant 51 within can be slow acting. Having substantial quantities of both for multiple periods when the system is temporarily "open" can insure years of trouble free operation.

Figure 5:
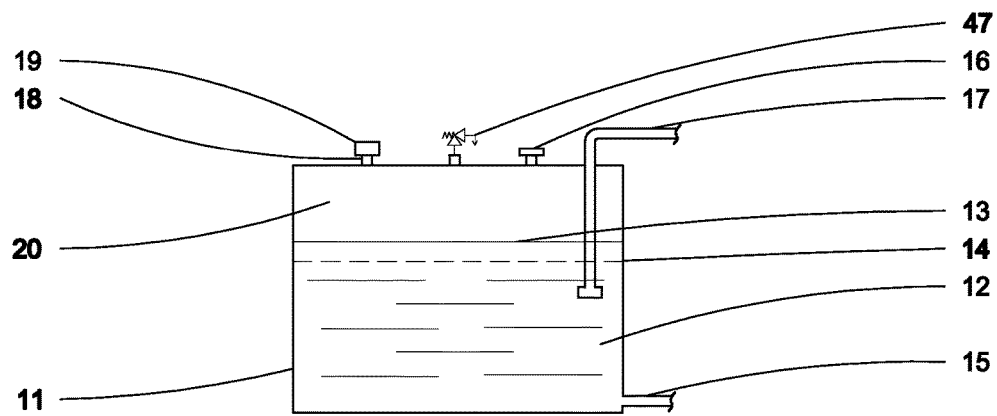
FIG. 5 is a schematic view of a conventional prior art oil reservoir with a prior art breather cap. This is considered an "open" system. Most systems are of this type.

Referring now to FIG. 5, there is shown a prior art system having a reservoir 11 in which is disposed a hydraulic fluid 12. The fluid 12 supplies the balance of the hydraulic system 15 that is distributed by pump to various system components and may reach pressures over 3,000 psi. The hydraulic system return 17 piping enters the reservoir 11 at low pressure. The reservoir has an oil fill port 16. The reservoir has a vent port 18 that include a breather cap 19 that may include a filter and or desiccant dryer. The internal air 20 above the oil 12 is considered being at or close to ambient air pressure. This is considered an "open" system.

As the hydraulic system operates, the oil 12 temperature increases, thus, warming the air 20 above the oil 12 in the reservoir 11. As the volume of the hydraulic oil 12 in the reservoir 11 varies it causes the oil level 13, 14 to rise or fall and this causes air 20 to pass either in or out of an air breather cap 19. When air 20 is expelled it may contaminate the surrounding ambient air 90 and areas with an oil mist. When ambient air 90 is drawn in to the system it contaminates the interior oil 12 with airborne contaminants.

Figure 6:
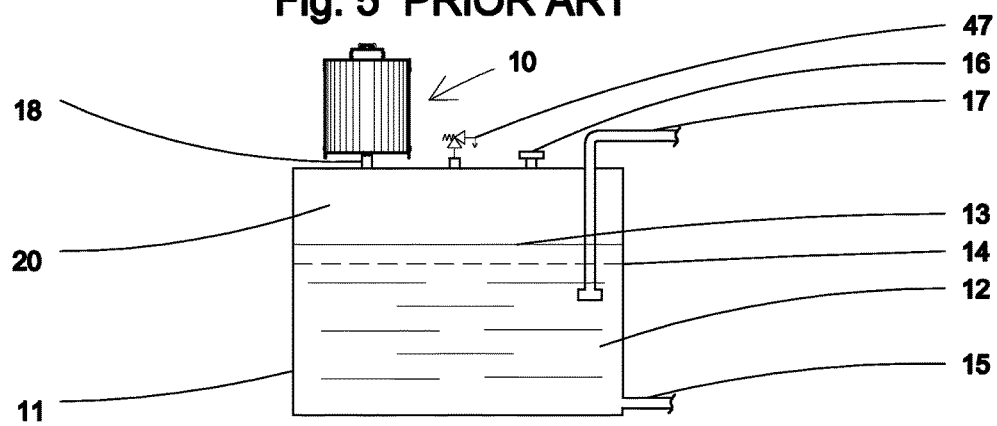
FIG. 6 is a schematic view of the auxiliary reservoir invention attached to the top of a conventional oil reservoir where the breather cap was located. This is now considered a normally "closed" system.

Referring now to FIGS. 1 and 6, there is shown apparatus in accordance with the invention which utilizes a generally similar reservoir 11 containing the hydraulic fluid 12.

Unlike the breather cap 19 connected to the air breather port 18 as shown in FIG. 5, the breather cap 19 is replaced by an auxiliary reservoir 10 apparatus with a combination cartridge 50 containing an oxygen absorber 52, desiccant dryer 51, metallic heat conduction rod 55, coalescing filter 54 and a variable volume device 40 plus low vacuum relief valve 41 and pressure relief valve 42, hereinafter referred to as oil protector 10.

The oil protector 10 includes a housing 30 or shell in which is disposed a bladder 40 or an elastic chamber 40. The bladder or elastic chamber 40 is sealed in fluid tight communication with the interior air 20 above the oil 12 within the reservoir 11.

Open vents 31 are provided in the housing 30 so that the ambient air pressure on the outside of the bladder 40 or elastic chamber 40 permit passage of ambient air 90 with its contamination, including moisture, on the outside of the bladder or elastic chamber 40.

Disposed in fluid communication with the interior of the bladder or elastic chamber 40 are respectively a vacuum relief valve 41 and a pressure relief valve 42, both of which might typically be set at plus or minus 0.5 psi. Also in fluid communication with the interior of the bellows or elastic chamber 40 as well as in communication with the interior air 20 of the reservoir 11 is a cartridge 50.

The cartridge 50 includes a desiccant 51; an oxygen absorber (steel wool) 52; pre-filter 53; coalescing filter 54. Said cartridge 50, is in close proximity to a metallic conduction rod 55. Said conduction rod 55 may slip through the cartridge 50. Said conduction rod 55 is substantially within the elastic chamber 40 or exposed to internal air 20 with an enlarged portion or conduction head 56 of the conduction rod 55 extended and exposed to outside ambient air 90.

Reservoir air 20 that is within the bellows or elastic chamber 40 and above the surface of the hydraulic fluid 12 in the reservoir 11 is dried and depleted of oxygen by the contents of the cartridge 50 with the aid of the conduction rod 55 especially when the system turns off and starts to cool down. That is when the internal air 20 humidity reaches near saturation and where the cool part of the conduction rod 55 attracts moisture.

The conduction rod 55 transfers heat energy, from the air 20, along its length to the conduction head 56 that is exposed to ambient air where heat energy is removed by the ambient air 90. The conduction rod 55 will vary in temperature along its length from a higher temperature to a lower temperature on the opposite end or conduction head 56 that is closer to ambient air 90 temperature. Part of the conduction rod 55 may then be at less than the dew point temperature of the air 20 within the elastic chamber 40.

The reservoir air 20 may be hot and moist and as this humid air comes in contact with the cooler portion of the conduction rod 55 the humidity near the surface will increase and condensation occurs. The high moisture or condensation is captured by the desiccant 51 and the oxygen molecules 60 in the air 20 along with water molecules 60 are drawn to and come in contact with the oxygen absorber 52 or steel wool 52 and undergo a chemical reaction and form iron oxide 52*a* or rust.

As this rusting process continues the oxygen molecules 70 in the air 20 constantly reduces from its initial 21 percent concentration to low or close to zero concentration. As this oxygen 70 reduction occurs the initial nitrogen 80 in the air starting with a normal 78 percent concentration increases substantially and may approach 99 percent. At the same time the desiccant 51 continues to remove moisture molecules 60 from the air 20 until the humidity drops to very low levels. The apparatus may contain a visual view port moisture indicator 43 that shows the relative humidity or degree of air dryness and an oxygen indicator 44 that shows the relative oxygen content in the air.

The vacuum relief valve 41 and the pressure relief valve 42 are provided in part to accommodate changes in air 20 and oil 12 volume that occur due to variation in temperature and system operation. In many systems it may never be necessary for such valves 41, 42 to actuate except during start-up to equalize the system. This is more likely to occur if the bellows 40 is of a large volumetric size that more than accommodates the expansion and contraction of the air 20 and oil 12 volume. If for unusual conditions the inclusion of these valves 41, 42 cause the system to operate temporarily as an "open" system such as in the event of some extreme condition, malfunction and or when first installed during start-up. In this case reservoir air 20 may exit the system or ambient air 90 may enter the system by means of the safety pressure relief valve on the reservoir.

Contrary to the prior art breather cap 19 systems which allow dirty ambient air 90 to enter and leave the reservoir 11, the present system allows such dirty air 90 only to enter the space between the housing 30 and the bellows or elastic chamber 40. The oil 12 fluid system including the reservoir 11 is thereby kept clean and free from dirt, moisture and oxygen. Thus, the system will work in various weather conditions including hot and dry conditions, cold and wet conditions, and even rainy and foggy conditions. In addition, even when the hydraulic system is turned off such as during the night, the effects of moisture and vapor pressure are completely treated or eliminated. Vapor migration occurs even without extensive air 20 movement. With the present invention, the bellows or elastic chamber 40 acts as a vapor barrier. If the system is initially dry and moisture free, then there will be no moisture problem.

The oxygen absorber (steel wool) 52 removes oxygen 70 from the internal air 20 as it undergoes a chemical reaction and turns to iron oxide or rust 52a. A filter barrier 53, 54, 54a prevents any of the rust 52a formation from leaving the cartridge 50.

Any outside ambient air 90 that does enter the system through the vacuum relief valve 41 will pass through the cartridge 50 and be exposed and treated by the filter 53, oxygen absorber 52, desiccant dryer 51 and coalescing filter 54.

Any expelled reservoir air 20 that may contain oil mist must pass through the cartridge 50 including the coalescing filter 54, wherein the oil mist will be coalesced into oil droplets 81 and drain back into the oil 12 in the reservoir 11. Thus the ambient environment will not be contaminated with any oil mist.

Figure 7:
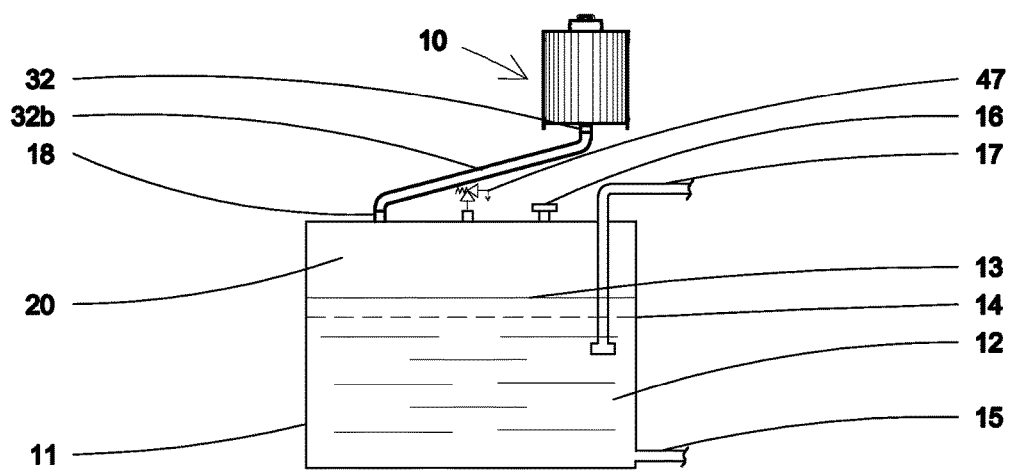
FIG. 7 is a schematic view of the auxiliary reservoir invention attached remotely to the top of a conventional oil reservoir where the breather cap was located. This is now considered a normally "closed" system.

Referring now to FIG. 7. This shows a similar hydraulic system to FIG. 6 but includes a remote oil protector 10. The preferred location of the oil protector 10 is always above the oil reservoir 11. The oil protector 10 connects the inlet connection 32 to vent port 18 of the reservoir 11 with a rigid pipe or flexible hose 33. The pipe or hose 33 should be sloped slightly downward so any oil mist collected drains back to the reservoir. The large reservoir 11 normally includes a safety pressure/vacuum relief valve that may be set for plus 2 psi and minus 1 psi and only operates if the oil protector 10 vacuum relief 41 and pressure relief valve 42 are insufficient to accommodate excessive air flow and rapid pressure differentials.

Referring now to FIG. 4. This shows an enlarged cross section schematic view of the oil protector 10. The housing 30 includes housing vent ports 31 to allow for the bladder 40 to expand or contract to accommodate the volumetric expansion and contraction of the air 20 and oil 12 in the reservoir 11 and hydraulic oil system. A cartridge 50 is shown within the bladder 40 that includes a steel wool oxygen absorber 52 and a desiccant 51 dryer such as silica gel both of which are in close proximity to a metallic heat conduction rod 55. Said conduction rod 55 is substantially within the air 20 within the bladder 40 with a conduction head 56 portion exposed to ambient air. A perforated protective guard 92 may cover the conduction head 56 to prevent accidental hand contact as this can become hot and cause burns.

The preferred embodiment shows the conduction rod 55 going through the center of the cartridge 50. This arrangement puts the steel wool oxygen absorber 52 and desiccant 51 in close proximity to the metallic conduction rod 55.

The temperature along the length of the conduction rod 55 varies from close to the hot reservoir air 20 temperature to that of ambient outside air. Part of the conduction rod may be at 120° F. while the conduction head may be at 60° F.

ASHRAE Psychometric Chart: General example of air properties during system operation: Consider a hydraulic system operating at the following conditions with nighttime shutdown and cooling to ambient temperatures with outside air 90 at 40° F.

Reservoir air 20 at 154° F. DB, 50% relative humidity (RH) with system on. Then system turns off and the air starts to cool following the dew point line until it reaches saturation at 126° F. and 100% saturation.

The hot end of the conduction rod 55 may be close to 120° F. while the conduction head may be 60° F.

A portion of the conduction rod 55 may be at 90° F. This is well below the 126° F. dew point and moisture molecules 60 in the saturated air 20 will condense into water 61 near the cool portion of the conduction rod 55.

This process continues during the cooling down of the system. The same general condensation principal occurs as the dew point drops lower and lower. This controlled point of condensation on the conduction rod substantially directs the condensed water into the desiccant 51 instead of dripping back into the oil 12.

Each time the system is on the water in the oil 12 is driven into the air 20 and more and more water 61 is extracted until no free water remains in the oil. That creates an ideal internal environment for the oil 12.

With this occurring on a daily basis, especially if the outside air temperature dropped to low temperatures, it will not take long for virtually all the water in the system to be captured by the desiccant and the oxygen absorber that is in close proximity to the conduction rod 55. The reservoir air 20 may eventually drop to a moisture content or Humidity Ratio of less than 0.002 or less. Then, when the system was operating with an air 20 temperature of 120° F. the RH may be less than 4%.

Figure 3:
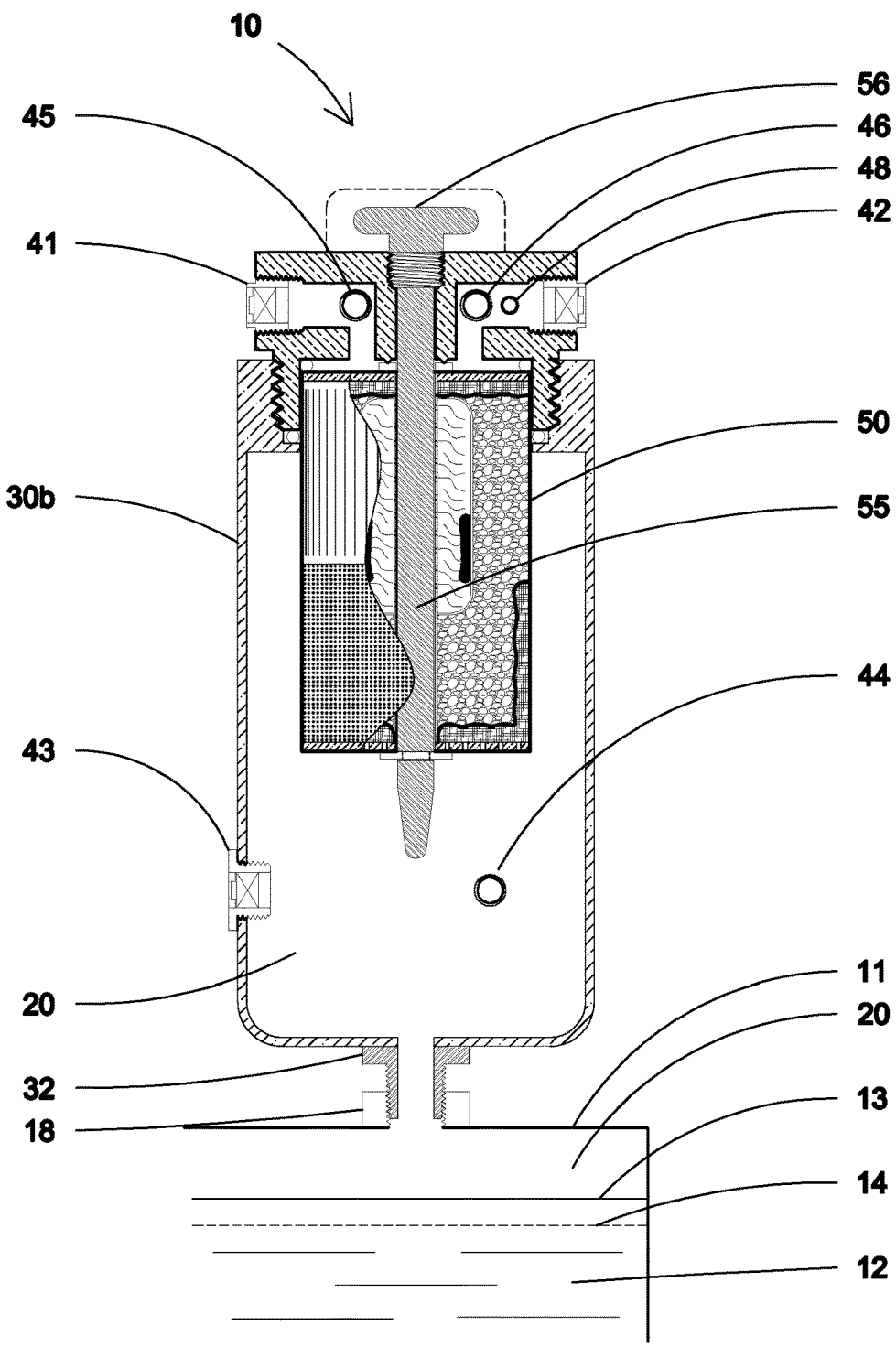
FIG. 3 is a schematic cross section view of a third embodiment of the auxiliary reservoir without a variable volume device for applications that do not require accommodation of volume changes. A plugged port is provided if it is decided to add the variable volume device thereafter.

Referring to FIG. 3: This shows a schematic view of the auxiliary reservoir without the variable volume device that is on an oil reservoir 11 that does not require volumetric changes. For example, a small polyethylene reservoir 11 allows for minor flexing or where extremely small volumetric changes occur. The housing 30b is not vented to atmosphere. A plugged port 44 is provided if it is decided to add the variable volume device 40 later.

Figure 2:
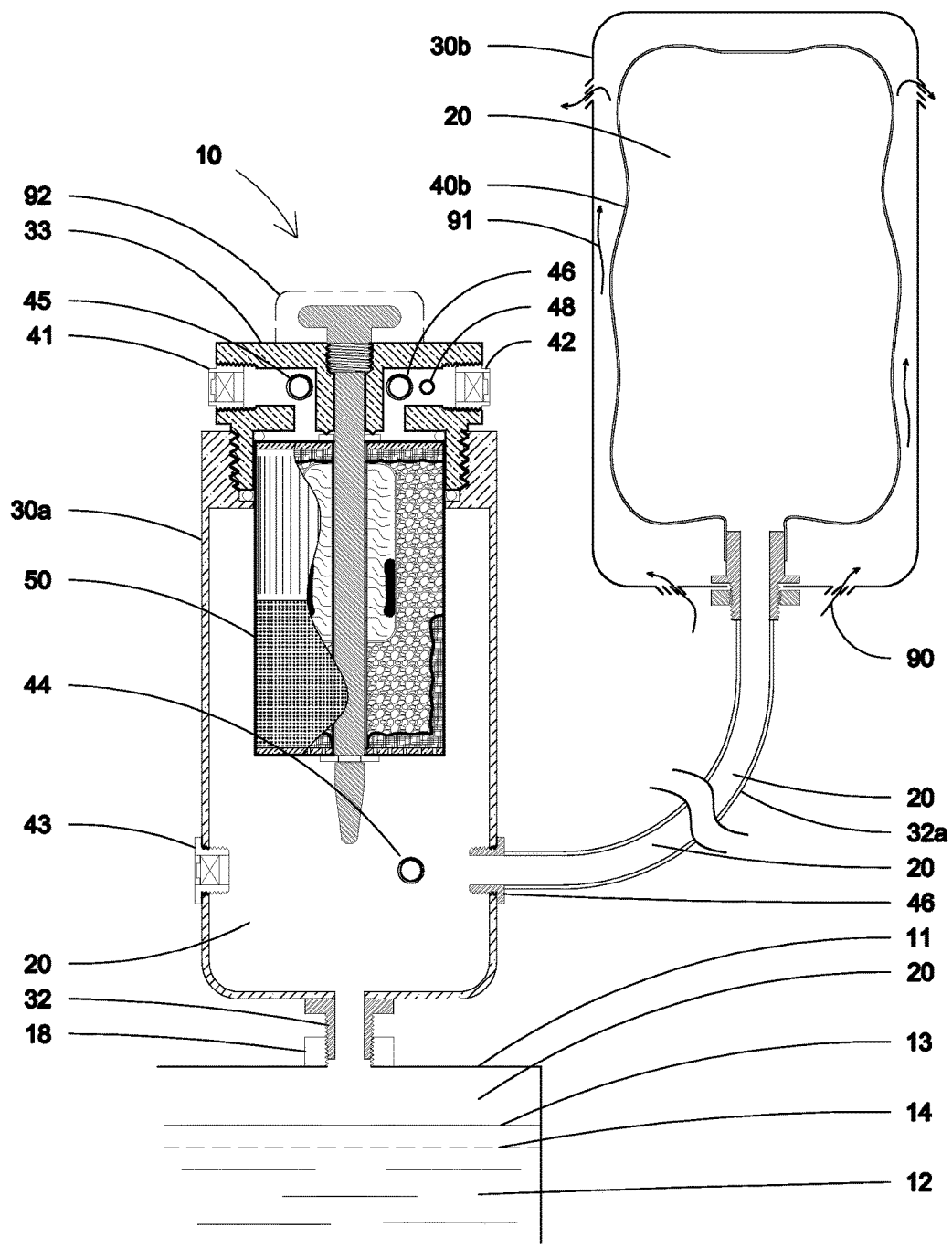
FIG. 2 is a schematic cross section view of a second embodiment of the present invention where a portion of the apparatus is remotely located. More particularly first auxiliary reservoir is attached to the oil reservoir and the second auxiliary reservoir (shown small and not to scale) is connected to the first auxiliary reservoir.

Referring to FIG. 2: This shows a schematic view of the invention where a large volumetric change occurs and where the bladder 40b portion of the apparatus is remotely located in a vented housing 30b. These are shown as the first housing 30a that is attached to the oil reservoir 11 and the second housing 30b (shown small and not to scale) connected to the first housing 30a. This view also shows an optional valve 48 port on the access cover 33 that allows the system to be charged with nitrogen.

This FIG. 2 also shows an optional connection 46 port that allows the bladder 40b to be located in fluid communication to the treated air between the access cover 33 and the cartridge 50. The bladder 40b is disposed in a vented housing 30b similar to the schematic drawing shown, however the tube 33 attaches to connection 46 port and connection 32 on housing 30b. This variation causes all the expanded and contracted air 20 to flow through the cartridge so it is treated by the desiccant 51 and oxygen absorber 52 each time a volumetric change occurs. This is a preferred embodiment for certain applications.

Figure 8:
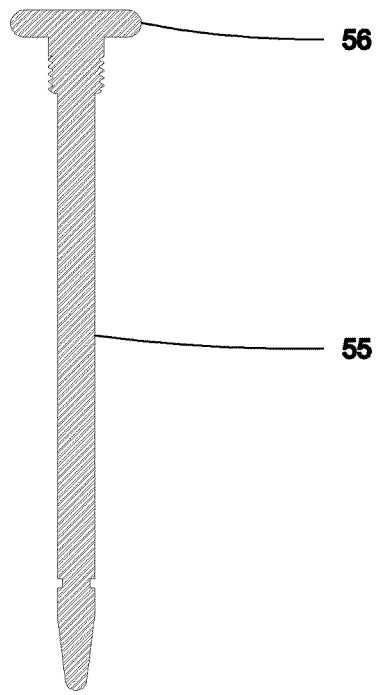
FIG. 8 is an enlarged view of a metallic heat conduction rod.
Figure 9:
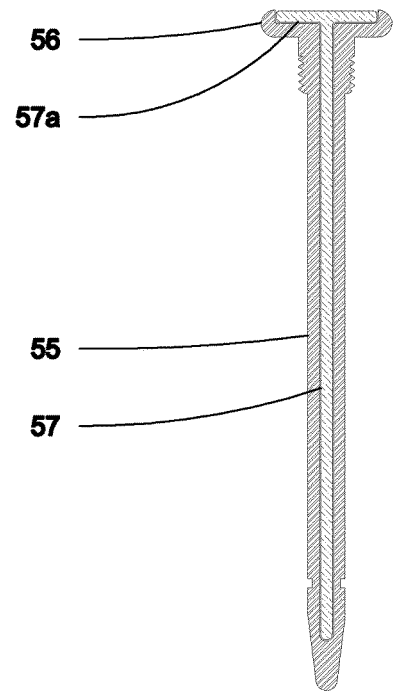
FIG. 9 is an enlarged view of a combination conduction rod and heat pipe.
Figure 10:
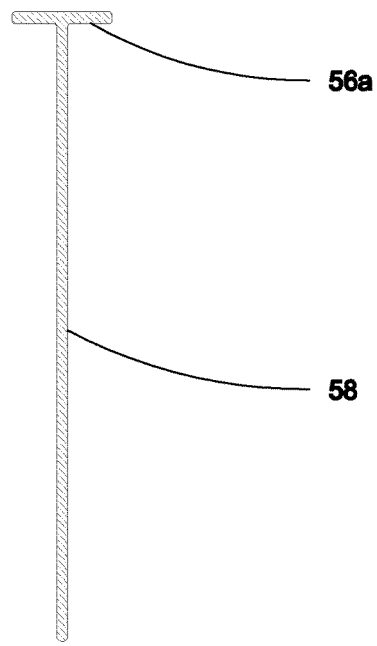
FIG. 10 is an enlarged view of a heat pipe used as the conduction rod.

Referring now to FIGS. 8, 9 and 10 that show the heat conduction rod and heat pipe:

FIG. 8 shows a solid metallic conduction rod 55 and conduction head 56 that may be brass, aluminum or other metal. This is preferred where a slow rate of heat loss is desired.

FIG. 9 shows a combination conduction rod 55 with a heat pipe 57 in the center. This is desired where a faster rate of heat transfer is desired. The heat pipe 56 and heat pipe head 56a that acts like the conduction rod 55 and is desired where the fastest rate of heat transfer is desired. All the above may have fins or extended surfaces to increase heat transfer.

Figure 11:
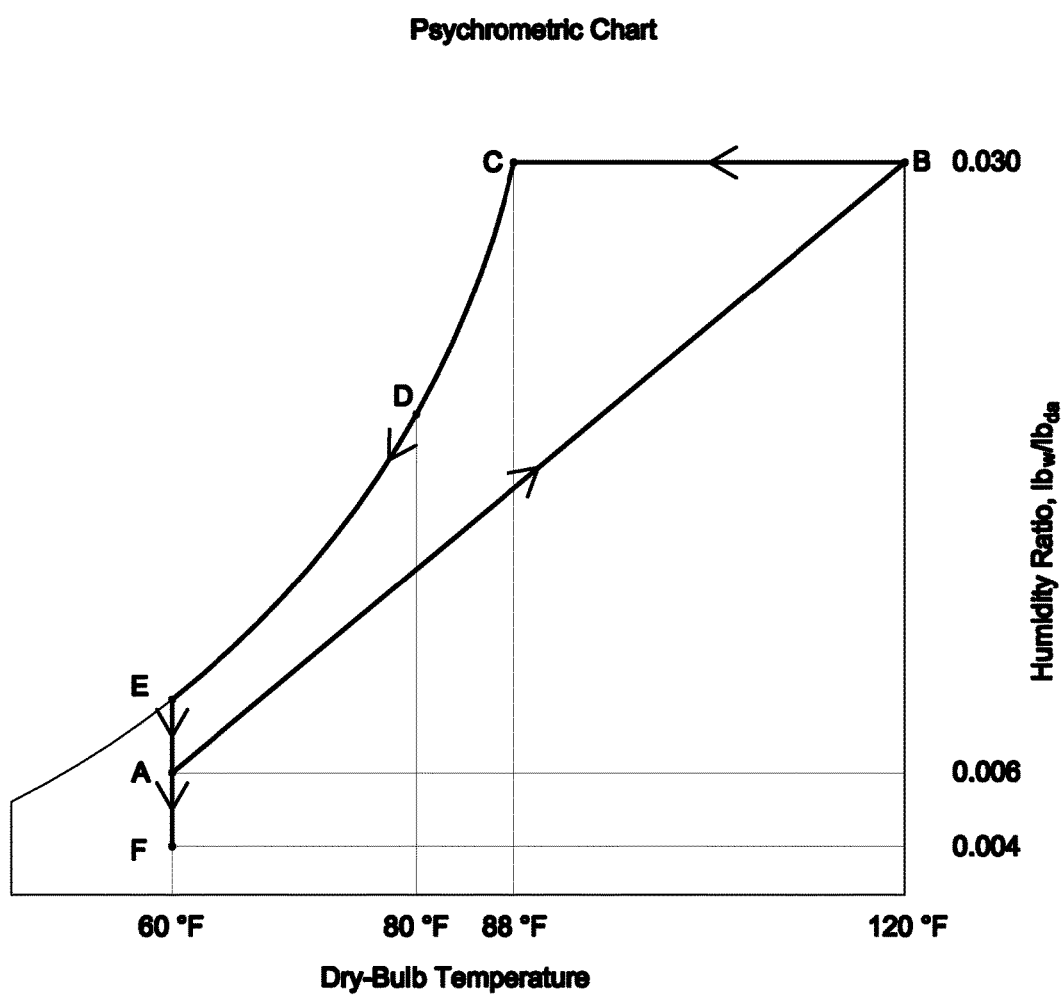
FIG. 11 is schematic diagram of an ASHRAE Psychometric Chart with the reservoir air properties at respective operating conditions plotted thereon.

Referring now to FIG. 11 there is shown a psychometric chart that shows various air properties including the amount of water the air can hold as air temperature changes. The hotter the air the more moisture it can hold. Very cold air contains very little moisture. This chart is used extensively in Heating, Air Conditioning and Refrigeration Engineering.

By knowing any two conditions such as dry bulb temperature (DB ° F.) and relative humidity (RH) we can locate that point on the Psych Chart and determine all the other properties of the air. The horizontal axis represents dry bulb (DB) temperature ° F. The vertical axis represents water content. Shown as Humidity Ratio, lbsw/lbda.

The lines that curve upwards and to the right represent different levels of relative humidity, in percent RH, in intervals of 10%. The top curved line is the Saturation Temperature ° F. This is also referred to as the Dew Point temperature ° F. This represents the 100% RH and is the point where condensation occurs as the DB temperature drops.

Other information including specific volume and enthalpy can also be found on the chart and are used in various energy related calculations.

Example for the present invention: Consider a hydraulic oil system that has some water in the oil and at the bottom of the reservoir and system low points. This is very typical of "open" systems. The following demonstrates how this invention can remove the water in the system:

When a hydraulic system is "off" and at ambient temperature the reservoir air may be say 60° F. and 45% RH. This represents point "A" on the chart.

Then the hydraulic system is turned "on" and the oil and air heats up to 120° F. Since there is water in the oil and at low points in the reservoir, as the oil and air heats up, some water vapor is driven out of the oil into the reservoir air. Depending on how hot the oil becomes and how much water is in the oil system, water vapor continues to enter the reservoir air and is shown as point "B", 120° F. and 40% RH. The water (humidity ratio) in the air increased from 0.006 to 0.03 lbsw/lba. This is a fivefold increase in the number of water molecules in the air.

The conduction rod of the invention becomes a cool point in the reservoir air. Assuming that part of the surface of the conduction is between the outside ambient air and the reservoir temperature or 80° F., (Point "D"). This is lower than the saturation temperature or dew point of 88° F., (Point "C").

A portion of the reservoir air is cooled by the conduction rod and condensation may form on a portion of the surface. In essence, water molecules are attracted to the cool surface on the conduction rod. During this period of operation while the hydraulic system is "on" the desiccant dryer and oxygen absorber become more active in capturing water molecules from the air.

Then, when the hydraulic system is turned "off" the reservoir air starts to cool down. During this period of shut down the conduction rod also becomes cooler and may reach 60° F./100% RH. (Point "E"). Water continues to condense on the cool portion of the conduction rod.

Then when the entire oil and reservoir system reaches ambient air conditions, the desiccant dryer will continue removing moisture from the air and the end point may be at Point "A". When virtually all the water is eventually removed from the oil and air the end point may drop to Point "F" or lower. The lower the better.

One variation that may be practical for large systems or before shipping manufactured oil protestors 10 include capping the connection port 32 and charging the internal bladder 40 with nitrogen through the nitrogen charge valve 46 on the cover 33. This keeps the oil protector 10 clean, dry and oxygen free until installed on a reservoir 11. This nitrogen charging is not practical or as necessary for small systems in the field if adequate steel wool 52 is in the cartridge 50.

A miniature auxiliary reservoir 10, in some embodiments is provided in a fluid cap for the brake system reservoir or the power steering system reservoir in automobiles.

Applications for the apparatus in accordance with the invention are not limited to conventional fluid power systems. More specifically, the invention may be used in lubrication systems in a gearbox or an automobile braking system as well as in various other commercial and industrial processes where a "closed" system with oxygen reduction and moisture drying is desirable.

Variations of this apparatus may include applications where periodic burping of air or gas may occur such as in an oil storage drum and where a bladder may be biased or where other features are incorporated such as a magnet, oil sample test port, pressure or temperature gages, instrumentation or remote oxygen content meter or remote humidity monitoring devices. In some applications activated carbon with hydrogen sulfide absorbing properties or other chemicals may be included in the cartridge 50. The variable volume device may be a bladder, bellows, or other shape and form that accommodate the system volumetric changes. The oxygen absorber and desiccant are shown in the same cartridge, however, they may be disposed within separate cartridges.

The invention has been described with reference to its illustrated preferred embodiment. Persons skilled in the art of constructing fluid systems may, upon exposure to the teachings herein, conceive variations in the mechanical development of the components therein as well as the applications for the apparatus. For example, the apparatus may be used for systems other than hydraulic systems such as robotics, diesel generators, oil transformers and other fluids. The apparatus is not limited to protecting fluids and may, for example, also be used for keeping large drums of moisture sensitive medical or industrial powders dry and oxygen free for long range storage. Such variations are deemed to be encompassed by the disclosure, the invention being delimited only by the appended claims.

The oil protector 10 can be used with new or existing hydraulic oil systems, gearboxes, lubrication systems and other oil containing systems. These various systems include those exposed to harsh and extreme environmental conditions and those that remain in clean spaces with very little temperature change. Some systems are very large to those that are very small. Some systems lack sufficient space for large oil protector and the bladder portion of the unit may need to be remotely located.

When the hydraulic system is in operation the oil 12 in the reservoir 11 can become very hot. The oil 12 temperature may be 120° F. to 160° F. or more. High temperatures are detrimental to oil and the reservoir 11. The exposed system surfaces help give up some of this heat energy to ambient air.

The following description of a preferred form of heat pipe will be understood to also have application to the description of embodiments of the present invention that alternatively use a conduction rod either alone or in combination with a heat pipe. A typical heat pipe consists of a sealed pipe or tube made of a material with high thermal conductivity such as copper or aluminum at both hot and cold ends. A vacuum pump is used to remove all air from the empty heat pipe, and then the pipe is filled with a fraction of a percent by volume of working fluid (or coolant) chosen to match the operating temperature. Alternatively, the pipe is heated until the fluid boils, and sealed while hot. Examples of such fluids include water, ethanol, acetone, sodium, or mercury. Due to the partial vacuum that is near or below the vapor pressure of the fluid, some of the fluid will be in the liquid phase and some will be in the gas phase. The use of a vacuum eliminates the need for the working gas to diffuse through any other gas and so the bulk transfer of the vapor to the cold end of the heat pipe is at the speed of the moving molecules. In this sense, the only practical limit to the rate of heat transfer is the speed with which the gas can be condensed to a liquid at the cold end.

Inside the pipe's walls, an optional wick structure exerts a capillary pressure on the liquid phase of the working fluid. This is typically a sintered metal powder or a series of grooves parallel to the pipe axis, but it may be any material capable of exerting capillary pressure on the condensed liquid to wick it back to the heated end. The heat pipe may not need a wick structure if gravity or some other source of acceleration is sufficient to overcome surface tension and cause the condensed liquid to flow back to the heated end.

The following description of a preferred form of heat pipe will be understood to also have application to the description of embodiments of the present invention that alternatively use a conduction rod either alone or in combination with a heat pipe. A typical heat pipe consists of a sealed pipe or tube made of a material with high thermal conductivity such as copper or aluminum at both hot and cold ends. A vacuum pump is used to remove all air from the empty heat pipe, and then the pipe is filled with a fraction of a percent by volume of working fluid (or coolant) chosen to match the operating temperature. Alternatively, the pipe is heated until the fluid boils, and sealed while hot. Examples of such fluids include water, ethanol, acetone, sodium, or mercury. Due to the partial vacuum that is near or below the vapor pressure of the fluid, some of the fluid will be in the liquid phase and some will be in the gas phase. The use of a vacuum eliminates the need for the working gas to diffuse through any other gas and so the bulk transfer of the vapor to the cold end of the heat pipe is at the speed of the moving molecules. In this sense, the only practical limit to the rate of heat transfer is the speed with which the gas can be condensed to a liquid at the cold end.

Inside the pipe's walls, an optional wick structure exerts a capillary pressure on the liquid phase of the working fluid. This is typically a sintered metal powder or a series of grooves parallel to the pipe axis, but it may be any material capable of exerting capillary pressure on the condensed liquid to wick it back to the heated end. The heat pipe may not need a wick structure if gravity or some other source of acceleration is sufficient to overcome surface tension and cause the condensed liquid to flow back to the heated end.

In some forms of the invention the pressure relief valve may be a roll over oil release valve assembly as part of the valve or in addition to the valve that prevents oil from exiting, but still allows air to exit the pressure relief valve should the automobile or transportation vehicle tip over in an accident. (Similar to JAZ Roll Over Valve marketed by JEGS High Performance of Delaware, Ohio 43015).

Some embodiments of the cartridge include a coalescing filter that captures oil mist from reservoir air that is expelled due to excessive pressure buildup that exceeds pressure relief valve setting, and turns the mist into oil droplets that drain back into the reservoir oil as well as at least partial perforations that allow reservoir air to pass through portions of the cartridge to reach the desiccant and oxygen absorber therein. The cartridge include partial perforations to allow for air passage through cartridge when certain vacuum release means or pressure release means are exceeded. Embodiments include a cartridge that includes a pre-filter to filter particles from entering ambient air passing through vacuum relief means. Some embodiments have a cartridge that has an opening through its length where a metallic heat conduction rod can pass through or be in close proximity with the oxygen and desiccant contents of the cartridge.

The conduction rod may be partially exposed to the reservoir air within the bladder and partially exposed to ambient air and may have an extended surface area for greater heat transfer. The composition may be a solid metal like brass, copper or aluminum or in combination with a heat pipe or be a heat pipe. The conduction rod may have different temperatures along its length between the hydraulic reservoir air temperature and the ambient air temperature, a portion of the conduction rod may be at less than the dew point temperature of the internal reservoir air. This will cause moisture molecules to migrate toward the cool portion of the conduction rod where condensation may occur and or where a nearby desiccant may capture water molecules or where a nearby oxygen absorber may capture both water molecules and oxygen molecules in the air and form iron oxide or rust; said reduction in oxygen molecules in the reservoir effectively increases the concentration of nitrogen in the reservoir air.

The access cover of the auxiliary reservoir may include an oxygen concentration indicator and a moisture or humidity indicator. Other accessory options include a temperature indicator and a pressure gage.

Additional features and advantages are realized through the techniques of the present invention. Other embodiments and aspects of the invention are described in detail herein and are considered a part of the claimed invention.

LISTING OF DRAWING ELEMENT IDENTIFYING NUMBERS

10 Oil Protector Invention or auxiliary reservoir.
11 Reservoir
12 Oil in the Reservoir
13 High oil level in reservoir.
14 Low oil level in the oil reservoir.
15 Piping to balance of hydraulic oil system.
16 Oil fill cap.
17 Hydraulic oil return line.
18. Breather vent port on reservoir.
19. Prior art breather cap. This may include a desiccant dryer and a filter.
20. Reservoir air above the oil.
30. Auxiliary housing vented as shown on FIG. 1.
30a. First auxiliary housing (This is a rigid sealed housing) as shown on FIG. 2.
30b. Second auxiliary housing (This is a vented housing) as shown on FIG. 2.
31. Vents in auxiliary housing 30 for ambient air flow outside of bladder as shown on FIG. 1.
32. Connection port on auxiliary reservoir (oil protector invention) that is in fluid communication to breather vent port on reservoir. See FIG. 1.
32a Tubing between auxiliary reservoir and second auxiliary reservoir. See FIG. 2
32b Tubing between reservoir and auxiliary reservoir. See FIG. 7.
33. Cover and frame for securing cartridge 50 to housing 30. See FIG. 1.
34. Gasket
35. O ring gasket.
37. Connection port on first auxiliary housing 30a for remote mounted second auxiliary housing 30b interconnected with pipe or hose 33. See FIG. 2.
40. Bladder or variable volume device in vented auxiliary housing with cartridge. See FIG. 1.
40a. Bladder or variable volume device in biased position, half full. See FIG. 1
40b. Remote bladder in second auxiliary housing shown interconnected and in fluid communication to the first auxiliary housing. See FIG. 2.
41. Vacuum relief valve in cover 33 may be set at minus 0.5 psi.
42. Pressure relief valve in cover 33 may be set at plus 0.5 .psi
43. Moisture indicator shows relative moisture content of air inside reservoir. Optional.
44. Oxygen indicator shows relative oxygen concentration inside reservoir. Optional.
45. Plugged port for pressure gage. Optional.
46. Ports on first auxiliary housing 30a for piping connection to a second auxiliary housing 30b. Optional. See FIG. 2.
47. Safety pressure relief valve on reservoir may be set at 2 psi.
48. Valve for charging system with nitrogen. Shown on cover. FIG. 2. Optional.
50. Cartridge that contains desiccant, steel wool oxygen absorber, coalescing filter and particle filters. The outer cartridge shell is partially perforated along with a perforated top and bottom to allow air flow. The cartridge has a perforated internal sleeve that allows passage of the conduction rod.
51. Desiccant dryer within cartridge that may be silica gel.
52. Steel wool or oxygen absorber.
52a. Iron oxide or rust that formed on the steel wool when exposed to oxygen.
53. Filter removes particles from ambient air that enters through vacuum relief valve.
53a. Filter surrounds steel wool oxygen absorber and retains any particles or rust.
54. Coalescing filter. This captures oil mist in any expelled air and turns it into oil droplets that drip back to the reservoir. It is located between the reservoir air and the pressure relief valve. It also filters and retains any desiccant dust or iron oxide particles that bay break off of the steel wool.
55. Metallic conduction rod. This is substantially extended through the center of the cartridge and is exposed to reservoir air. Solid metal rod provides for slow acting heat transfer, which may be preferred with certain systems.
56. Conduction rod head exposed to ambient air.
57. Heat pipe within or attached to the heat pipe. The heat pipe addition provides faster heat transfer that may be preferred with certain systems.
57a. Heat pipe head exposed to ambient air.
58. Heat pipe in place of conduction rod. The heat pipe used in place of the conduction rod provides the fastest heat transfer that may be preferred with certain systems.
58a. Heat pipe head exposed to ambient air.
60. Moisture or water molecules in reservoir air migrating toward conduction rod.
61. Moisture that condensed on conduction rod and captured by desiccant.
62. Water molecule attracted toward conduction rod and captured by desiccant or oxygen absorber.
70. Oxygen molecules in reservoir air.
71. Oxygen molecules that bind with iron in the steel wool to form iron oxide.
80. Nitrogen molecules that increase in concentration as oxygen molecules are depleted by the oxygen absorber in forming iron oxide or rust.
81. Oil droplets from coalescing filter.
90. Ambient air.
91. Ambient air flowing between auxiliary housing and exterior of bladder.
92. Protective guard over conduction head to prevent burns when hot.

While the invention has been described in detail herein in accordance with certain preferred embodiments thereof, many modifications and changes therein may be affected by those skilled in the art. Accordingly, it is intended by the appended claims to cover all such modifications and changes as fall within the spirit and scope of the invention.

What is claimed is:

1. An apparatus which comprises:
   (1) a system selected from the group consisting of
      (a) hydraulic systems in which a force that is repetitively applied to a liquid at one point within a confined space that is repetitively transmitted to another point using an incompressible liquid and
      (b) lubrication systems that utilize a pump to repetitively force a liquid lubricant into the interface between two parts that move with respect to each other;
   having a combination of liquid and gas in abutting relationship within the system, and a pump that repetitively forces movement of said liquid, and
   (2) said system being sealed and having a reservoir having an interior;
   means for isolating ambient air from said reservoir;

means for allowing the volume of the system to vary to permit variations in the volume of all fluids within the system;

an oxygen absorber within the system disposed in fluid communication with a volume of gas within said reservoir;

a unitary thermally conductive member having a first part extending outside of said system and a second part extending into said system and contacting the volume of gas above said liquid within said reservoir, said system further including a desiccant proximate to said second part whereby the operation of the apparatus causes the temperature within the system to be higher than the temperature outside of the system, accordingly, the ambient of said second part is warmer than said first part whereby heat will be conducted within said unitary thermally conductive member from said second part to sad first part whereby heat will be dissipated by said first part whereby condensation within said system will occur proximate to said second part and said desiccant will absorb the condensate whereby water is removed from the gas in said system and said system is isolated from ambient atmospheric conditions.

2. The apparatus as described in claim 1 wherein said oxygen absorber is selected from the group that consists of steel wool and a plurality of iron filings.

3. The apparatus as described in claim 1 wherein said unitary thermally conductive member is a heat pipe.

4. The apparatus as described in claim 1 wherein said means for allowing the volume of the system to vary includes a variable volume device to permit variations in the volume of all fluids within the system.

5. An apparatus which comprises:
a system and a cooperating subsystem,
said system being selected from the group consisting of
(a) hydraulic systems in which a force that is repetitively applied to a liquid at one point within a confined space is repetitively transmitted to another point using an incompressible liquid and
(b) lubrication systems that utilize a pump to repetitively force a liquid lubricant into the interface between two parts that move with respect to each other;
having a reservoir holding, during normal operation, a combination of liquid and gas in abutting relationship, a vent communicating with the gas in said reservoir and a pump that repetitively forces movement of said liquid, and said subsystem having a sealed housing having an interior;

a fluid connector communicating with the interior of said housing;

means for allowing the combined volume of said system and said subsystem to vary to permit variations in the volume of all fluids within said system and said subsystem when said subsystem is connected to said system;

an oxygen absorber within the housing disposed in fluid communication with a volume of gas within said housing;

a unitary thermally conductive member having a first part extending outside of said subsystem and a second part extending into said housing and contacting a volume of gas in fluid communication with the gas above the liquid within said reservoir, said subsystem further including a desiccant proximate to said second part whereby the operation of the apparatus causes the temperature within the subsystem to be higher than the temperature outside of the subsystem, accordingly, the ambient of said second part is warmer than said first part whereby heat will be conducted within said unitary thermally conductive member from said second part to said first part whereby heat will be dissipated by said first part whereby condensation within said subsystem will occur proximate to said second part and said desiccant will absorb the condensate whereby water is removed from the gas in said subsystem and system because of the connection between the subsystem and the subsystem and both said subsystem and said system are isolated from ambient atmospheric conditions; and said fluid connector in said subsystem being in fluid communication with said vent in said system.

6. The apparatus as described in claim 5 wherein said oxygen absorber is selected from the group that consists of steel wool and a plurality of iron filings.

7. The apparatus as described in claim 5 wherein said unitary thermally conductive member is a heat pipe.

8. The apparatus as described in claim 5 wherein said means for allowing the combined volume of said system and said subsystem to vary includes a variable volume device.

* * * * *